United States Patent [19]

Eberl

[11] Patent Number: 4,665,113

[45] Date of Patent: May 12, 1987

[54] PROCESS FOR THE PREPARATION OF AN AGGLOMERATED MOLDING POWDER COMPOSED OF POLYTETRAFLUOROETHYLENE AND METALLIC FILLERS

[75] Inventor: Karl Eberl, Burgkirchen, Fed. Rep. of Germany

[73] Assignee: Hoechst Aktiengesellschaft, Fed. Rep. of Germany

[21] Appl. No.: 850,503

[22] Filed: Apr. 10, 1986

[30] Foreign Application Priority Data

Apr. 13, 1985 [DE] Fed. Rep. of Germany ....... 3513262

[51] Int. Cl.$^4$ .................. C08K 3/08; C08L 27/18; C08J 3/16; C10M 107/38
[52] U.S. Cl. .................. 524/156; 524/166; 524/440; 524/546
[58] Field of Search ............. 524/156, 166, 440, 546

[56] References Cited

U.S. PATENT DOCUMENTS

| | | | |
|---|---|---|---|
| 3,766,133 | 10/1973 | Roberts et al. ................ | 524/546 |
| 3,781,258 | 12/1973 | Kometani et al. ............. | 524/546 |
| 3,929,721 | 12/1975 | Leverett ........................ | 524/546 |
| 3,980,596 | 9/1976 | Leverett ........................ | 524/546 |

FOREIGN PATENT DOCUMENTS

| | | | |
|---|---|---|---|
| 0040136 | 11/1981 | European Pat. Off. ........... | 524/546 |
| 2149693 | 4/1972 | Fed. Rep. of Germany ...... | 524/546 |
| 0017040 | 9/1966 | Japan ............................... | 524/156 |
| 0144744 | 11/1975 | Japan ............................... | 524/546 |
| 6150623 | 11/1981 | Japan ............................... | 524/546 |
| 1033638 | 6/1966 | United Kingdom .............. | 524/546 |

*Primary Examiner*—Herbert J. Lilling
*Attorney, Agent, or Firm*—Connolly and Hutz

[57] ABSTRACT

The joint agglomeration of PTFE and metal-containing fillers belonging to the group comprising copper, tin and alloys thereof with one another and with other metals is improved if an alkylsulfate or an alkanesulfonate having 10 to 18 carbon atoms is added to the liquid agglomeration medium.

2 Claims, No Drawings

PROCESS FOR THE PREPARATION OF AN AGGLOMERATED MOLDING POWDER COMPOSED OF POLYTETRAFLUOROETHYLENE AND METALLIC FILLERS

The invention relates to a process for the preparation of an agglomerated molding powder composed of agglomerates of a non-melt-fabricable tetrafluoroethylene polymer, together with at least one finely divided metallic filler belonging to the group comprising copper and tin and alloys thereof with one another or with other metals, the filler being present in a uniformly divided state in the agglomerated particles, by premixing, suspending and stirring, with agglomeration, of a finely divided, granular tetrafluoroethylene polymer powder and the filler in a liquid medium composed of water and an organic liquid which wets the tetrafluoroethylene polymer powder and is soluble in water to the extent of not more than 15% by weight, in the presence of a water-repellent.

Finely divided, granular polytetrafluoroethylene (PTFE) powders, that is to say powders which have been produced by the process of suspension polymerization and then ground, possess a low bulk density and poor flow properties. In order to remedy this shortcoming, powders of this type have, since a long time back, been subjected to agglomeration by agitation in a liquid medium composed of water and a water-immiscible organic liquid which wets the powder particles. Particles of filler are also agglomerated in this manner together with the particles of the granular PTFE powder, but a considerable proportion of the filler is lost in this process, particularly if it is a hydrophilic filler. This fraction, which is removed from the agglomerating medium, can only be recovered from the liquid phase incompletely and with considerable effort.

It is known to add certain agents intended to prevent the segregation of the hydrophilic filler to the aqueous phase during the agglomeration process. Agents of this type which have already been disclosed are relatively longchain carboxylic acids or salts thereof, in U.S. Pat. No. 3,980,596, and organosilanes or water-soluble silicone resins, in U.S. Pat. No. 3,929,721. It is also known initially to coat hydrophilic fillers, such as bronze and other metal powders, with such agents in a separate procedure prior to the joint agglomeration with PTFE, and then to mix the filler which has been pretreated in this way with PTFE in the dry state, and to feed this mixture to an agglomeration process (cf. for example, U.S. Pat. No. 3,766,133, Example 17).

Whereas the last-mentioned pretreatment of the filler constitutes a laborious additional process stage which cannot prevent partial segregation of the filler and hence losses of filler, when fairly long-chain carboxylic acids or organosilanes or silicones are added to the liquid agglomeration phase, colored inhomogeneities in the form of pointlike discolorations or zones of different colors are observed on shaped articles produced from the filler-containing agglomerates thus obtained. Even with these processes a loss of expensive filler is unavoidable.

It was therefore required to develop a process for the joint agglomeration of PTFE and the said metallic fillers, which does not suffer from the disadvantages described.

This object is achieved in accordance with the invention, in a process of the type mentioned initially, by the presence, in the liquid medium during the agglomeration process, of an alkanesulfonate or an alkylsulfate which has an alkane or alkyl radical containing 10 to 18 carbon atoms.

The alkylsulfates $R-O-SO_3M$ can be products of identical chain length or mixtures of such products of identical chain length with a radical R which represents an alkyl radical having 10 to 18 carbon atoms, it being possible for R itself to be a branched carbon chain, but the sulfate is derived from a primary fatty alcohol, or the sulfate can be derived from a secondary or tertiary alcohol in which the chains in turn can in themselves be branched. The dodecylsulfates (laurylsulfates) are preferred. The alkylsulfates can, however, also be chain length cuts containing a preponderant proportion of chains within the range from 10 to 18 carbon atoms. Similarly, the alkane radical R of the alkanesulfonate $R-SO_3M$ can carry the $-SO_3M$ group either in a terminal position or at any desired point in the chain, it being possible for this chain also to be in itself branched. Because of their preparation, alkanesulfonates are in most cases mixtures of radicals R differing in respect of their length and/or their degree of branching, but agents of identical chain lengths can, of course, also be used. Here too, in the case of mixtures, the preponderant fraction (for instance greater than 80 per cent) of the alkyl radicals should have 10 to 18 carbon atoms. Proportions of disulfonates and trisulfonates are also possible. M is an alkali metal, alkaline earth metal or $NH_4$ cation or an $N(R^1)_4$ cation in which at least one of the radicals $R^1$ is a short-chain alkyl radical which is optionally substituted by OH, and the other radicals $R^1$ can be hydrogen atoms. M is preferably an alkali metal or magnesium or, particularly, sodium. Mixtures of the said alkanesulfonates can also be employed.

These alkylsulfates or alkanesulfonates or mixtures thereof should be present in a proportion of 2 to 1,000 ppm, preferably 10 to 200 ppm, relative to the amount by weight of the mixture of PTFE plus filler, in the liquid medium during the agglomeration process.

The fillers employed are finely divided metal powders of copper or tin or alloys of these metals with one another or with other metals, such alloys containing at least one of the two constituents and this constituent constituting at least 20% by weight of copper or at least 5% by weight of tin. Alloys of this type should also have a melting point which is higher than the sintering temperature of PTFE, 327° C., preferably higher than 350° C. The following are examples of suitable alloys of this type: the various brass alloys, containing, besides copper and zinc, other alloyed constituents, such as lead, tin, nickel or manganese; the copper-nickel alloys or the copper-nickel-zinc alloys which are known as nickel silver; but preferably the alloys of copper and tin (tin bronzes) which are in most cases understood by the general designation "bronze" and which, if appropriate, also contain other alloy constituents to a minor extent, such as, for example, zinc or lead. In addition to these named constituents, alloys of this type which can be used for the purposes of the invention can also contain to a minor extent further metallic or non-metallic alloy constituents not mentioned above (such as, for example, phosphorus). The mixtures of these metallic fillers with PTFE, which are used, in particular, as materials for abrasion-resistant slide bearings, contain 1 to 75% by weight, preferably 20 to 60% by weight, of the filler.

The particle size $d_{50}$ of the metallic fillers is expediently 5 to 100 μm, preferably 10 to 30 μm. The said metallic fillers can also be mixed with one another, if this is advisable for certain end uses.

The process according to the invention relates to the agglomeration of tetrafluoroethylene polymers which cannot be processed from the melt. This term is to be understood as meaning primarily the homopolymer, namely polytetrafluoroethylene itself, but also, additionally, the so-called "modified" tetrafluoroethylene polymers, i.e. polymers of tetrafluoroethylene which contain a fluorinated, or preferably perfluorinated, co-monomer in an amount so small—in most cases ≦2 mol %—that the character of the polymer as "non-melt-fabricable" is not decisively altered. Examples of such comonomers are chlorotrifluoroethylene, hexafluoroisobutylene or 1-perfluorobutene, but especially perfluoroalkyl perfluorovinyl ethers containing a perfluoroalkyl radical having 1 to 5 carbon atoms and hexafluoropropylene. Insofar as the abbreviation PTFE is used in this description, it relates to all these types of polytetrafluoroethylene. Suspension polymers of tetrafluoroethylene are employed for the agglomeration process leading to a PTFE molding powder of high bulk density and good flow, and the PTFE obtained by this process, which, as a crude polymer, has an average particle size of 800 μm or higher, is subjected to one of the known comminution processes for PTFE—for example grinding in a hammer mill or wet cutting—and is thus brought into a state of fine division having an average particle size of ≦200 μm. Similarly, the fillers employed should be in a finely divided form, i.e. should have an average particle size as indicated above. The agglomeration process itself is known to those skilled in the art, for example from U.S. Pat. Nos. 3,527,857 and 3,781,258. In these processes, the PTFE powder which has been premixed with the fillers is suspended in a liquid medium composed of water and an organic liquid, it being necessary that this organic liquid is capable of wetting the PTFE powder and additionally of being soluble in water up to 15% by weight, preferably up to 3% by weight. Examples of such organic liquids are hydrocarbons or mixtures thereof, for example n-heptane, n-octane, gasoline fractions, in particular those having boiling points between 80° and 150° C., cyclohexane, benzene or toluene; halogenated hydrocarbons, for example perchloroethylene, chloroform, trichloroethylene or carbon tetrachloride, or chlorofluoro hydrocarbons, such as 1,1,2-trifluoro-1,2,2-trichloroethane. The ratio of water to solids, i.e. the total of PTFE powder and filler, should be within the range from 3:1 to 1:3, and the ratio of solids to organic liquid should be within the range from 1:1 to 10:1 parts by weight. The proportion by weight of the filler in the mixture with PTFE is within the range from 1 to 75, preferably 20 to 60% by weight. The suspended mixture of PTFE and filler is then stirred for a fairly long period to achieve agglomeration; the mixture can meanwhile be kept at room temperature or can be heated at temperatures below or at the boiling point of the organic liquid employed; it is preferable to carry out the process at 40° to 50° C. The energy of stirring, the duration and the temperature determine the extent of the agglomeration, which can be adjusted by a suitable choice of these parameters. When the agglomeration process is complete, the resulting powder is separated from the organic liquid in a suitable manner, washed in water, dried and, if appropriate, separated by screening from agglomerates having an excessively large or small particle size.

The process according to the invention makes it possible to remove virtually completely the discolorations which occur when known agents are used, so that the shaped articles prepared from such agglomerated compositions have an appearance with a homogeneous color even after the sintering process. Furthermore, losses of filler occurring during the agglomeration process by segregation and removal of the filler are eliminated almost completely, so that the densities calculated from the amount of PTFE powder employed and metallic filler employed are also approximately achieved in the agglomerated powder. The agglomerated molding powders thus produced evidently also have a more homogeneous distribution of the filler within the agglomerated particle, which manifests itself in shaped articles produced therefrom in a substantially improved strength and elongation at break.

The molding powders, prepared in accordance with the invention, which have been agglomerated and treated with fillers of the type mentioned are used as materials for slide bearings, specifically in the form of films or moldings.

The following examples are intended to illustrate the invention:

EXAMPLES 1 to 9

800 g of a finely ground polytetrafluoroethylene powder produced by suspension polymerization, having an average particle diameter $d_{50}$ of 25 μm, are intimately mixed in a fluid mixer with 1.5 kg of a tin bronze (composition 90% by weight of copper and 10% by weight of tin) having an average particle diameter $d_{50}$ of 20 μm. This mixture is introduced with stirring into an agglomeration vessel of capacity 10 liters (height 35 cm and diameter 20 cm) already containing a solution of the particular water-repellent used (see Table I below for the amount and type). After the gas space has been flushed with nitrogen, 0.4 liter of a gasoline fraction having a boiling range between 80° and 110° C. is added with stirring, and the mixture is homogenized for 2 minutes by means of an ®Ultra-Turrax and is then stirred for a further 30 minutes 750 r.p.m. by means of a four-bladed propellor stirrer of diameter 10 cm. The agglomerate is then filtered off and dried at 250° C. for 12 hours. Table I below shows not only the type and amount of water-repellent, but also the mechanical properties of films obtained from such agglomerated, filler-containing molding powders (measured as specified in ASTM 638-67; test specimens prepared as specified in ASTM 1708-66). The density achieved by mixing the abovementioned amount of PTFE powder with the abovementioned amount of tin bronze is 3.96 g/cm³. The decrease in the density is a measure of the loss of filler which has occurred in agglomeration. Examples A to C are comparison tests, A using a water-repellent according to U.S. Pat. No. 3,929,721 and B and C using a water-repellent according to U.S. Pat. No. 3,980,596.

TABLE I

| Example No. | Water-repellent | Concentration (ppm) | Tensile strength (N/mm$^2$) | Elongation at break (%) | Density (g/cm$^3$) | Appearance of a film compression-molded from the resulting molding powder |
|---|---|---|---|---|---|---|
| 1 | $C_{12}H_{25}$—O—$SO_3$Na | 100 | 17.4 | 260 | 3.90 | homogeneous |
| 2 | $C_{12}H_{25}$—O—$SO_3$Na | 200 | 21.9 | 150 | 3.92 | homogeneous |
| 3 | $C_{12}H_{25}$—O—$SO_3$Na | 500 | 21.5 | 150 | 3.93 | homogeneous |
| 4 | Alkylsulfonates+ | 10 | 17.0 | 270 | 3.94 | homogeneous |
| 5 | Alkylsulfonates+ | 50 | 16.3 | 275 | 3.94 | homogeneous |
| 6 | Alkylsulfonates+ | 100 | 16.2 | 175 | 3.94 | homogeneous |
| 7 | Alkylsulfonates+ | 200 | 15.9 | 155 | 3.94 | homogeneous |
| 8 | Alkylsulfonates++ | 100 | 17.7 | 210 | 3.95 | homogeneous |
| 9 | Na n-hexadecylsulfonate | 100 | 17.8 | 230 | 3.94 | homogeneous |
| A | Methylphenylsiloxane | 100 | 18.7 | 165 | 3.87 | dark points |
| B | $C_{11}H_{23}$COOH | 100 | 21.5 | 170 | 3.89 | dark points, marbled |
| C | $C_{11}H_{23}$COOH | 250 | 17.3 | 150 | 3.88 | dark points, marbled |

+ Sodium salts of a mixture of secondary alkanesulfonic acids in which 80% by weight of the alkanesulfonic acids contain 14 to 16 carbon atoms and the mixture contains about 20% by weight of alkanedisulfonic acids (commercial product ®K 30 made by Bayer AG)

++ Sodium salts of a mixture of secondary alkanesulfonic acids in which 85% by weight of the alkanesulfonic acids contain 13 to 17 carbon atoms and the mixture contains about 10% by weight of alkanedisulfonic acids (commercial product ® Hostapur SAS made by Hoechst AG)

I claim:

1. A process for the preparation of an agglomerated molding powder composed of agglomerates of a non-melt-fabricable tetrafluoroethylene polymer together with at least one finely divided metallic filler belonging to the group comprising copper and tin and alloys thereof with one another or with other metals, the filler being present in a uniformly divided state in the agglomerated particles, by premixing, suspending and stirring, with agglomeration, a finely divided, granular tetrafluoroethylene polymer powder and the filler in a liquid medium composed of water and an organic liquid which wets the tetrafluoroethylene polymer powder and is soluble in water to the extent of not more than 15% by weight, in the presence of a water-repellent, the improvement which comprises an alkanesulfonate or an alkylsulfate containing an alkane or alkyl radical having 10 to 18 carbon atoms being present in the liquid medium during the agglomeration process.

2. The process according to claim 1, wherein sodium laurylsulfate is employed as the alkylsulfate.

* * * * *